BINARY DIGITAL-TO-ANALOGUE CONVERTERS
Filed Feb. 23, 1965
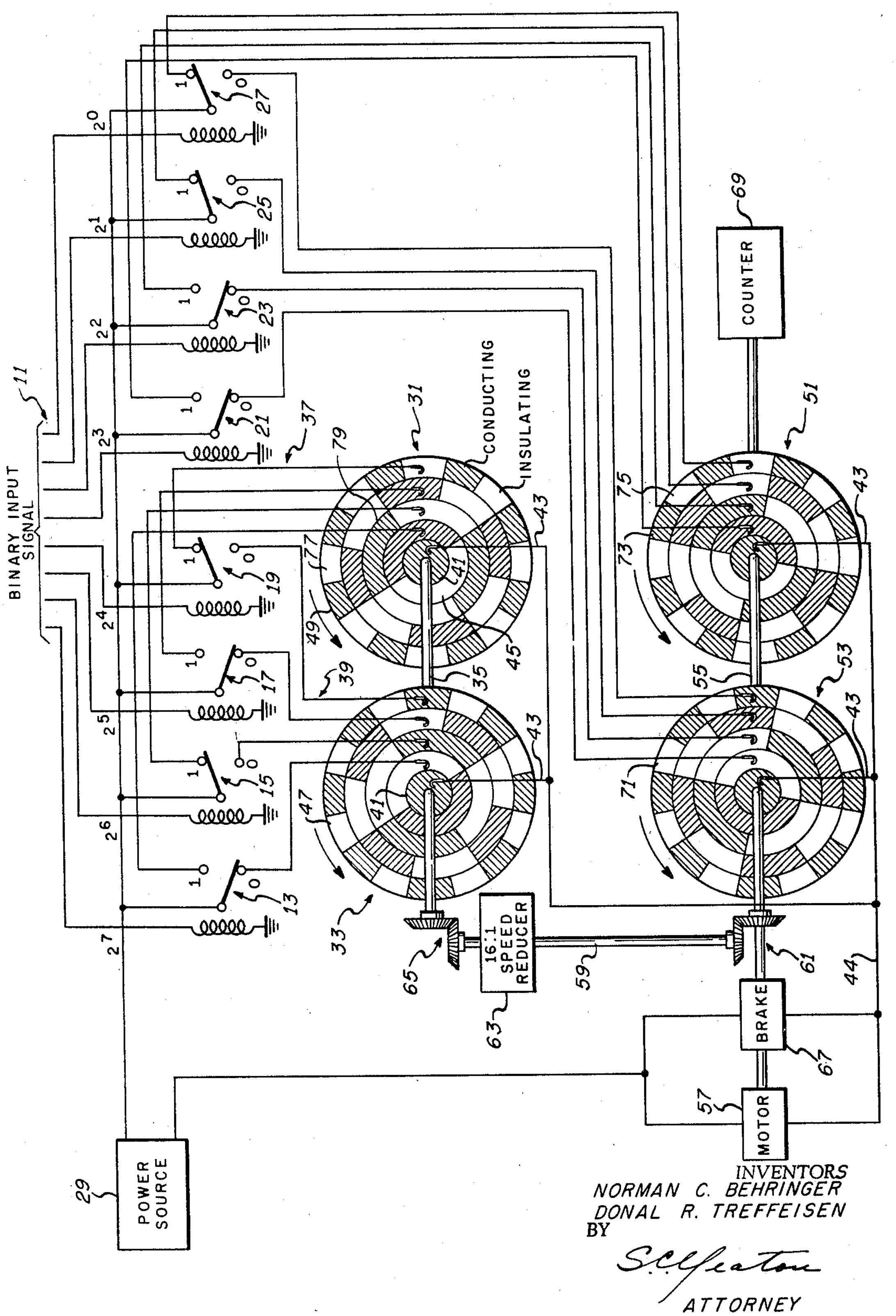
INVENTORS
NORMAN C. BEHRINGER
DONAL R. TREFFEISEN
BY
S. C. Yeaton
ATTORNEY United States Patent Office 3,396,383
Patented Aug. 6, 1968

3,396,383

BINARY DIGITAL-TO-ANALOGUE CONVERTERS

Norman C. Behringer, Scottsdale, Ariz., and Donal R. Treffeisen, Huntington Station, N.Y., assignors to Sperry Rand Corporation, Great Neck, N.Y., a corporation of Delaware Filed Feb. 23, 1965, Ser. No. 434,537
8 Claims. (Cl. 340—347)

ABSTRACT OF THE DISCLOSURE

A binary-to-digital converter having pairs of rotatable coded wheels. Binary ZERO and binary ONE digits of the received signal are segregated and applied to the first and second wheels, respectively, of a given pair. The wheels are coded to block successively, each possible combination of binary digits and rotated until complete signal blockage occurs.

This invention relates to digital coded converters and more particularly to means for converting binary digital signals to their decimal equivalents.

It is frequently necessary to convert binary coded signals used in digital computers to the equivalent decimal coded indication so that the results of a computation can be readily interpreted by the operator.

Prior art methods for accomplishing this conversion usually require complex mathematical manipulations in that these methods involve repeated operations using relatively elaborate equipment.

Many prior art methods are also subject to errors in conversion in that they employ electrical components whose critical characteristics change with time. These devices are particularly difficult to use in situations in which incoming data is to be sampled at a low rate.

It is an object of the invention to provide a binary-to-decimal converter that is relatively simple and compact.

It is another object of the present invention to provide a binary-to-decimal converter that operates without conversion error.

It is still another object of the present invention to provide a binary-to-decimal converter that is especially suited for situations in which discrete input data signals are presented at a low sampling rate.

These and other objects are accomplished by providing a device in which selected terminals on a multiple switching means may be energized in a pattern representative of the binary signal to be processed, opening various circuit combinations in the switching means in a predetermined sequence, and counting the number of switching functions necessary to prevent all current flow through the switching means.

The principles of the invention may be understood by referring to the following description and the accompanying drawing in which the single figure, partly in schematic form, represents one embodiment of the invention.

Referring now to the figure, a group of input terminals 11 are arranged to receive individual signals representing the bits of a parallel binary code. The embodiment shown in the drawing is adapted to receive an 8-bit binary code.

Signals from the various input lines are conducted to the coils on the various double-throw relays 13, 15, 17, 19, 21, 23, 25, and 27. These relays are so arranged that a binary ONE on an input line will pull the armature of the associated relay into the upper or binary ONE position. The armatures of all relays are connected to a power source 29.

A first pair of code wheels 31 and 33 are mounted integrally on a shaft 35. These wheels are constructed according to well-known techniques so as to have a number of annular tracks. Alternate segments of conductive and nonconductive material in each track are arranged to provide a switching sequence in which the successive values in the binary code contact the groups of input brushes 37 and 39. The shaded segments in the drawing represent conducting sections whereas the unshaded segments represent insulating sections.

A central hub of conductive material 41 is electrically connected to all of the conductive segments in a given wheel. Thus an electrical voltage applied to any one of the conducting segments through an input brush in the group 37 will enable a current to pass through the wheel 31 and out of the common brush 43. Similarly, the remaining code wheels each contain central conducting hubs from which current may be taken by one of the common brushes 43 and applied to a common bus 44. The innermost annular track 45 contains a single conducting segment and a single insulating segment; each succeeding annular track contains double the number of segments contained in the next innermost track.

The wheel 31 represents a binary ONE code wheel and is connected to the binary ONE terminals of the relays 13–19 through the binary ONE input brushes 37.

Similarly, the wheel 33 of the first pair represents a binary ZERO code wheel since it is connected to the binary ZERO terminals of the relays 13–19 through the binary ZERO input brushes 39. The wheels 31 and 33 are inversely related in that corresponding segments of the two wheels are of the opposite conductivity type. Thus insulating segment 47 of the wheel 33 corresponds to conducting segment 49 of the wheel 31. Both wheels, however, contain the conducting central hub 41.

A second pair of code wheels 51 and 53 are mounted integrally on a shaft 55. The wheel 51 is identical to the wheel 31 and the wheel 53 is identical to the wheel 33. Wheels 51 and 53 are driven directly from an electric motor 57 through the shaft 55.

A second shaft 59 is driven by the motor through the bevel gears 61. The shaft 59 drives a 16:1 speed reducer 63 which, in turn, drives the shaft 35 through the bevel gears 65.

It should be noticed that the first pair of wheels 31 and 33 always retain the same spatial relationship with respect to each other since these wheels are mounted on the same shaft. In the same fashion, the second pair of wheels 51 and 53 always retain the same spatial relationship with respect to each other. The spatial relationship between the first and the second pairs is not fixed, however, but changes during an operating cycle because of the speed reducer 63.

The annular tracks of the code wheel 51 are connected through individual brushes to the upper or binary ONE terminals of the lower order relays 21–27. The annular tracks of the code wheel 53 are connected through individual brushes to the lower or binary ZERO terminals of the same relays.

Thus the first pair of code wheels 31 and 33 respond to the higher order values in the received binary coded signals whereas the second pair of code wheels 51 and 53 respond to the lower order values in the received binary coded signals.

The input brushes operate as scanning elements in that they traverse the various combinations of segments during an operating cycle. Although these electrical conduction and non-conduction combinations that have been described are presently preferred, it will be appreciated that other scanning methods may be employed. Photoelectric scanning elements, for instance, combined with code wheels containing opaque and transparent segments might be preferred in certain applications. In this arrangement, the passage of light through any transparent segment would be used to generate an electrical signal that could be amplified and applied to the motor and brake.

An electrically operated brake 67 is connected in parallel with the motor 57. The brake operates to clamp the shaft 55 whenever power flow to the brake is interrupted. This brake serves to prevent overtravel when the motor is turned off.

A decimal counter 69 is actuated through the shaft 55. This counter is arranged to advance one unit each time the brush on the outermost annular track of the wheel 51 passes from one segment to the next. A counter in the form of a drum display, arranged to provide 16 counts for each revolution of the shaft 55 is presently preferred, however, other well-known types of displays such as photoelectric shaft sector counters may be used if desired.

The counter in general, should have a capacity equal to the capacity of the code wheels. Thus for the converter illustrated in the accompanying figure, a counter would preferably have a capacity of 256 so that resetting the code wheels to a position of zero reading would also reset the counter. However, counters having an independent reset means may be used for this purpose if desired.

When a parallel binary signal is applied to the group of input lines 11, the relays connected in those lines receiving a binary ONE will be actuated thus establishing a current path from the power source to the appropriate binary ONE code wheel 31 or 51 as the case may be. Relays that are connected to a line receiving a binary ZERO signal will remain unactuated thus retaining a current path from the power source 29 to the binary ZERO code wheel 33 or 53 as the case may be. Any input brush thus energized that happens to be in contact with a conducting segment will allow a current to pass through the output brush so as to release the brake 67 and energize the motor 57. Current flow to the motor will continue until each wheel reaches the position in which each energized input brush contacts an insulating segment.

To begin an operating cycle, the code wheels and the counter are set to a zero position. In the zero position, none of the relays are energized, therefore none of the input brushes associated with the binary ONE code wheels 31 and 51 are energized. All of the input brushes connected to the binary ZERO input wheels 33 and 53, however, are energized. The position of the code wheels corresponding to a given binary number is that position in which each input brush that happens to be energized contacts an insulating segment. For the zero position of the code wheels, this will occur when the wheel 33 is rotated to the position in which the segment 47 contacts the outermost brush of the group 39 and the wheel 53 is rotated to the position in which the segment 71 contacts the outermost brush associated with that wheel. This, of course, will bring the segment 49 on wheel 31 into contact with the outermost brush of group 37 and a segment 73 on the wheel 51 into contact with the outermost brush associated with that wheel. These binary ONE brushes, however, are not energized, therefore current cannot flow through these particular paths even though the brushes happen to contact conducting segments.

With the wheels in the position indicated, no current can flow to the motor 57 and the brake 67 will clamp the shaft 55 in the proper position.

If, now, a binary ONE (00000001) is applied to the input lines, the 2° line will be energized. The relay 27 will pull in so that current can flow through the outermost brush on the wheel 51, through the segment 73 to the brush 43 and on to the motor 57 and the brake 67. This will release the brake and cause the motor to rotate the shaft 55 counterclockwise until the code wheel 51 reaches the next segment. This next segment is an insulating segment so current flow through this outermost brush is interrupted. Current flow cannot be established through any of the remaining binary ONE input brushes because none of these are energized. Current flow cannot be established through the energized binary ZERO input brushes because they contact insulating segments on the wheel 53.

Since the code wheels 31 and 33 turn at 1/16 the speed of the code wheels 51 and 53, the various segments originally in contact with the input brushes of the slower moving wheels 31 and 33 will remain in contact during this conversion cycle.

In order to better visualize the operation of the circuit when larger numbers are encountered, assume that the binary equivalent of the number "83" is encountered. In binary form, this number is equal to 01010011. The relays will be set in the condition shown in the drawing and the code wheels will ultimately come to rest in the position shown in the drawing.

At the beginning of the cycle the wheels are set to the zero position. This is the position in which the segments 47, 49, 71, and 73 are in contact with their respective brushes.

During the first revolution of the wheels 51 and 53, the outermost brush of the wheel 31, which is energized, will provide a current path to the motor and brake regardless of the condition of the remaining brushes. During the second revolution of the wheels 51 and 53, the outermost brush of the wheel 31 will be in contact with an insulating segment 77, however the next-to-innermost brush on the same wheel is energized through the relay 15 and is in contact with the conducting segment 79. By following the operation in this manner it will be seen that at least one energized brush associated with the wheels 31 and 33 is in contact with a conducting segment for five complete revolutions of the wheels 51 and 53. At the beginning of the sixth revolution of these wheels, the counter will have a reading of "80" and the wheels 31 and 33 will be in a position such that the outermost brushes are just making contact with the segments with which they are shown in contact in the drawing. In this position, no current paths are available to conduct current to the motor and the brake through these particular wheels. Any current flowing to the motor must be received through the wheels 51 and 53. Current paths will be established through these wheels until an additional three segments have contacted brushes associated with the wheels 51 and 53 and they are in the position depicted. The counter will now display a decimal count of "83."

Although the speed reducer has been illustrated as having a ratio equal to 16:1, it will be understood that this ratio depends upon the particular design of the code wheels. The reducer must rotate the slower moving wheels at a speed such that they advance one segment for each rotation of the faster moving wheels. In general, for the type of converter shown in the drawing, the slower moving wheels should rotate at a speed equal to $2^{-n}$ times the speed of the faster moving wheels when a $2n$ bit code is to be used.

A device constructed according to the principles of the present invention is essentially a mechanically actuated switching device in which the inverse code wheels provide positive control. Such a device is not dependent upon critical amplifiers or other electronic components that may drift and cause conversion errors.

Because the code wheels are rotated only during an actual conversion operation, the device is ideally suited for situations involving low data sampling rates.

It will be appreciated that the principles of the invention can be applied to circuits in which more than two pairs of code wheels are employed or to circuits using only a single pair of code wheels. Code wheels having more than four tracks may also be employed in order to accommodate binary codes having more than four bits.

If desired, the two code wheels constituting a single pair may be combined in a single wheel. In this instance the single wheel could, for instance, contain the tracks corresponding to the binary ONE wheel near the central portion of the single wheel and the tracks corresponding to the binary ZERO wheel near the rim of the single wheel.

In general, any cyclically operated switching means capable of connecting various combinations of current paths representing either successively greater or successively smaller values of the desired code may be used in practicing the invention. Photoelectric code wheels, code drums, or tapes may be used in preference to the particular code wheels described heretobefore if so desired.

Although a decimal counter is presently preferred as a readout device, it will be appreciated that any one of a wide variety of devices that are capable of indicating the magnitude of the shaft rotation may be employed if desired.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A binary-to-decimal converter comprising means to receive a binary coded signal; a group of binary ZERO scanning elements; a group of binary ONE scanning elements; means to energize individual binary ZERO scanning elements corresponding to binary ZERO digits in a received signal; means to energize individual binary ONE scanning elements corresponding to binary ONE digits in the received signal; means coupled to each scanning element to provide a driving current when any scanning element is energized; cyclical switching means to block the flow of any driving current arising from various selected combinations of scanning elements; driving means to actuate said switching means in the sequence in which successive selected combinations represent successively greater binary numbers in the code to be used, said driving means being energized by said driving current; and means to count the number of switching operations undergone by said switching means.

2. A binary-to-decimal converter comprising a group of binary ZERO input brushes; a group of binary ONE input brushes; means to energize those binary ZERO input brushes corresponding to binary ZERO digits in the received signal; means to energize those binary ONE input brushes corresponding to binary ONE digits in the received signal; cyclical switching means cooperating with each group of input brushes to block the flow of current from selected combinations of said brushes; driving means to actuate said switching means in the sequence in which successive selected combinations represent successively greater binary numbers in the code to be used, said driving means being energized only through said switching means; and means to count the number of switching operations undergone by said switching means.

3. A binary-to-decimal converter comprising a group of binary ZERO input brushes; a group of binary ONE input brushes; means to energize those binary ZERO input brushes that correspond to binary ZERO digits in the received signal; means to energize those binary ONE input brushes that correspond to binary ONE digits in the received signal; first and second binary code wheels cooperating with the binary ZERO and binary ONE input brushes respectively, said first and second code wheels being integrally mounted on a common shaft, said code wheels further having inversely related patterns of conducting and nonconducting segments; electrically actuated means to rotate said wheels; means to energize said electrically actuated means from said input brushes through said code wheels; and means to indicate the total rotational motion of said wheels during a conversion cycle.

4. A binary-to-decimal converter comprising an individual input switching means for each digit in the binary code to be used; first and second groups of conductors, each group having a conductor representative of each digit in the binary code to be used; said input switching means being arranged to energize the associated conductor in either one of said first and second groups according to the value of the binary digit received by that switching means; first and second cyclical switching means for sequentially connecting various combinations of current paths to an external circuit, said combinations of current paths being representative of successive values in a binary code, said combinations of current paths being arranged so that a given value in the binary code is represented by a combination which prevents current flow; said first and second groups of conductors being connected to the input of said first and second cyclical switching means respectively; electrically operated means to actuate both cyclical switching means in response to currents passing through any of the combinations of current paths; and a decimal counter arranged to count the number of combinations switched by the cyclical switching means during an operating cycle.

5. A binary-to-decimal converter comprising a plurality of input leads equal in number to the number of digits in the binary code to be used; first and second groups of conductors; individual input switching means connected to each input lead, said input switching means being arranged to energize the corresponding conductor in said first group when the associated input lead receives a binary ONE signal, said input switching means being further arranged to energize the corresponding conductor in said second group when the associated input lead receives a binary ZERO signal; first and second cyclical switching means for sequentially connecting various combinations of current paths to an external circuit, said combinations of current paths being representative of successive values in a binary code, said combinations of current paths being further arranged so that a given value in the binary code is represented by a combinatioin which prevents current flow; said first and second groups of conductors being connected to the input of said first and second cyclical switching means respectively; an electric motor to actuate both of said cyclical switching means, said electric motor being energized through said cyclical switching means; and a decimal counter arranged to indicate the total rotation of the shaft of said motor.

6. In combination:

(a) first and second code wheels mounted integrally on a common shaft, (b) a motor to rotate said shaft, (c) a brake to arrest the rotation of said shaft, (d) a counter to indicate the total rotation of said shaft, (e) a plurality of annular tracks on each code wheel, said tracks being divided into alternate conductive and nonconductive segments, said segments being proportioned so that the member of segments in any track is double the number of segments in the next smaller track, the innermost of said tracks containing a single conductive and a single nonconductive segment, (f) the segments on the two wheels being further arranged in an inverted relationship so that any conductive segment on one wheel is paired with a nonconductive segment in the corresponding position on the other wheel, (g) a plurality of signal input lines equal in number to the number of tracks on either of said code wheels, (h) a double-throw relay for each signal input line, each of said relays being actuated through the associated signal input line, (i) a plurality of brushes, each brush contacting an associated one of said tracks, (j) means to connect the normally open contacts on the various relays to the individual brushes associated with the first of said code wheels, (k) means to connect the normally closed contacts on the various relays to the individual brushes associated with the second of said code wheels, (l) means to connect the armatures of all of the relays to a common source of potential, (m) means to conduct an electrical current from the code wheels to said motor whenever any of the brushes contact a conducting segment, and (n) Means to engage said brake whenever the motor is de-energized.

7. A binary-to-decimal converter comprising first and second groups of binary ZERO input brushes; first and second groups of binary ONE input brushes; means to energize those binary ZERO input brushes that correspond to binary ZERO digits in the received signal; means to energize those binary ONE input brushes that correspond to binary ONE digits in the received signal; first and second pairs of binary code wheels; first and second code wheels in said first pair cooperating with said group of binary ZERO input brushes and with said first group of binary ONE input brushes respectively; first and second code wheels in said second pair cooperating with said second group of binary ZERO input brushes and with said second group of binary ONE input brushes respectively; said first and second code wheels in each pair further having inversely related patterns of conducting and nonconducting segments; electrically actuated means to rotate the first pair of code wheels; a speed reducer to rotate the second pair of code wheels at 1/16 the speed of the first pair of code wheels; means to energize said electrically actuated means from said input brushes through any of said code wheels; and means to indicate the total rotation of said first pair of code wheels.

8. A binary-to-decimal converter for use with a $2n$ bit parallel code comprising:

(a) a first pair of code wheels mounted integrally on a first common shaft, (b) a second pair of code wheels mounted integrally on a second common shaft, (c) a motor to rotate the first common shaft, (d) a speed reducer to rotate the second common shaft at a speed equal to $2^{-n}$ times the speed of the first common shaft, (e) a brake to arrest the rotation of the motor, (f) $n$ annular tracks on each code wheel, said tracks being divided into alternate conductive and nonconductive segments, said segments being proportioned so that the number of segments in any track is double the number of segments in the next smaller track, the innermost of said tracks containing a single conductive and a single nonconductive segment, (g) the segments on the two wheels in a given pair being further arranged in an inverted relationship so that any conductive segment on one wheel is paired with a nonconductive segment in the corresponding position on the other wheel of that pair, (h) $2n$ signal input lines, (i) a double-throw relay for each signal input line, each of said relays being actuated through the associated signal input line, (j) a plurality of brushes, each brush contacting an associated one of said tracks, (k) means to connect the normally open contacts on the various relays to the individual brushes associated with the first of said code wheels in each pair, (l) means to connect the normally closed contacts on the various relays to the individual brushes associated with the second of said code wheeels in each pair, (m) means to connect the armature of all of the relays to a common source of potential, (n) means to conduct an electrical current from the code wheels to said motor whenever anyone of the brushes contact a conducting segment, and (o) means to engage said brake whenever the motor is de-energized.

References Cited

UNITED STATES PATENTS

| | | | |
|---|---|---|---|
| 2,775,727 | 12/1956 | Kernahan et al. | 318—28 |
| 2,909,769 | 10/1959 | Spaulding | 340—347 |
| 2,923,471 | 2/1960 | Triman et al. | 235—155 |
| 2,989,680 | 6/1961 | Weiser et al. | 340—347 |
| 3,036,292 | 5/1962 | Beall | 340—172.5 |
| 3,136,989 | 6/1964 | Loudon | 340—347 |
| 3,158,090 | 11/1964 | Wasserman | 101—93 |
| 3,247,503 | 4/1966 | Stupar | 340—347 |
| 3,296,614 | 1/1967 | Gryk | 340—347 |
| 3,319,054 | 5/1967 | Kelling | 235—154 |

MAYNARD R. WILBUR, *Primary Examiner.*

W. J. KOPACZ, *Assistant Examiner.*